United States Patent
Cottrill et al.

(10) Patent No.: US 6,622,347 B1
(45) Date of Patent: Sep. 23, 2003

(54) LATCHING AND TENSIONING MECHANISM FOR A CLAMP OR THE LIKE

(75) Inventors: Gary L. Cottrill, Wadsworth, OH (US); Randy G. Toddy, Wadsworth, OH (US)

(73) Assignee: Clampco Products, Inc., Wadsworth, OH (US)

( * ) Notice: Subject to any disclaimer, the term of this patent is extended or adjusted under 35 U.S.C. 154(b) by 0 days.

(21) Appl. No.: 10/080,205

(22) Filed: Feb. 22, 2002

(51) Int. Cl.[7] .............................................. B65D 63/00
(52) U.S. Cl. ........................................ 24/70 R; 24/272
(58) Field of Search ......................... 24/270–273, 70 R; 254/206, 108, 237–240, 247

(56) References Cited

U.S. PATENT DOCUMENTS

| | | | | |
|---|---|---|---|---|
| 369,529 A | * | 9/1887 | Kellogg ........................ | 254/108 |
| 948,078 A | * | 2/1910 | Stauffer ....................... | 254/237 |
| 1,466,977 A | * | 9/1923 | Tremayne .................... | 254/237 |
| 1,516,748 A | * | 11/1924 | Modee ........................ | 254/237 |
| 1,656,319 A | * | 1/1928 | Cowley ....................... | 254/237 |
| 2,043,141 A | * | 6/1936 | Wilmesherr ................. | 254/108 |
| 3,352,539 A | * | 11/1967 | Witt ............................ | 410/23 |
| 3,730,480 A | * | 5/1973 | Moyer ......................... | 24/272 |
| 3,737,147 A | * | 6/1973 | Morgan et al. ............. | 254/108 |
| 5,157,815 A | | 10/1992 | Dyer ........................... | 24/270 |
| 5,548,876 A | | 8/1996 | Oetiker ........................ | 24/271 |
| 6,048,146 A | | 4/2000 | Wiedmeyer .................. | 410/100 |

OTHER PUBLICATIONS

Photograph of a Clampco Products, Inc. Clamp (undated).
Clampco Products, Inc. brochure "Over–Center Latches", 2 pages (undated).

* cited by examiner

*Primary Examiner*—James R. Brittain
(74) *Attorney, Agent, or Firm*—Renner, Kenner, Greive, Bobak, Taylor & Weber

(57) ABSTRACT

A latching device (10) is designed to tension a clamp (11) or the like which has open ends (11A, 11B). The device (10) includes at least one ratchet link (16) pivotally carried by a support (12) which is affixed to one end (11B) of the clamp (11). A handle assembly (41) and a pawl (47) are pivotally carried by a bracket (34) which is affixed to the other end (11A). A yoke (53) is pivotally carried by the handle assembly (41). The pawl (47) is adapted to engage a tooth (22) of the ratchet link (16) to maintain a degree of tension on the clamp, and the yoke (53) engages another tooth (22) such that upon rotation of the handle assembly (46), the yoke (53) pulls the ratchet link (16) and advances the engagement of the pawl (47) to another tooth (22). In view of the relationship of the various pivoting axes, the handle assembly (41) is of the "overcenter" type such that when the desired tension of the clamp (11) is reached, the handle assembly (41) may be locked in place.

19 Claims, 6 Drawing Sheets

US 6,622,347 B1

LATCHING AND TENSIONING MECHANISM FOR A CLAMP OR THE LIKE

TECHNICAL FIELD

This invention relates to a latching and tensioning device for band clamps, steel straps, v-band couplings and the like. More specifically, this invention relates to such a device which can provide adjustable tensioning without the requirement of utilizing any tools.

BACKGROUND ART

Items such as band clamps which can be used, for example, to couple a hose to a fitting, steel straps which can be used, for example, to bind loose elements of a load together, and v-band couplings which can be used, for example, to couple the circumferential flanges of axially adjacent pipes or the like, need to be provided with some type of tensioning device. These clamps and the like are continuous items but for a gap which is formed between opposed ends, the size of which controls the amount of tension being placed on the clamp. Thus, the gap is closed by some form of tensioning device.

Most simply, this tensioning device can be an overcenter link latch where a link is provided at one of the ends and is captured by a rotating leverage handle carried by the other end. In this way, the two opposed ends are connected to each other. However, these devices suffer in that they only provide one degree of tension, that is, the amount of tension provided by the device cannot be adjusted. As a result, these types of clamps can only be utilized for applications where a single-sized item is consistently to be clamped with the same tension.

In response to this limitation, adjustable tensioning devices have been developed whereby the user may adjust the gap between clamp ends until the clamp is fully tensioned. Central to the design of these devices is a threaded fastener which can be turned by means of a tool, such as a wrench, until the desired tension is obtained.

In the past, these adjustable devices have taken on several forms. In most all of these forms, there is a threaded bolt with a crosspiece at the end thereof thereby forming what is known as a t-bolt. In the most basic of these types of devices, one of the ends of the clamp is provided with a trunnion through which the bolt passes. The "t" end of the bolt is captured by the other end of the clamp. The trunnion provides a bearing surface for a nut as it is tightened on the threaded bolt to draw the ends together until the desired tension is reached. When the tension on the clamp is to be removed, the nut must again be turned on the shaft.

In a similar device, the crosspiece is captured by an open hook carried by one end of the clamp. The device is tensioned in the same way, as by turning a nut against a trunnion. In another instance, a yoke can be hinged to a rotating leverage handle which serves as an overcenter handle latch. In this device, once the proper tension is placed on the device by turning the nut on the shaft, the opening of the handle can loosen the clamp without having to change the tension setting by rotating the nut on the shaft.

In all instances, in order to provide an adjustable tensioning device, a separate tool must be used to create the tensioning which can, in many instances, represent an inconvenience to the user.

DISCLOSURE OF THE INVENTION

It is therefore an object of the present invention to provide a latching device for a clamp or the like which can be utilized to adjust the tension on the clamp.

It is another object of the present invention to provide a latching device, as above, which can be operated without the need for a separate tool.

It is an additional object of the present invention to provide a latching device, as above, which includes an overcenter closure and a ratchet which can be advanced while at the same time maintaining the established tension.

It is a further object of the present invention to provide a latching device, as above, which is easy to operate and convenient to use.

These and other objects of the present invention, as well as the advantages thereof over existing prior art forms, which will become apparent from the description to follow, are accomplished by the improvements hereinafter described and claimed.

In general, a clamping apparatus made in accordance with the present invention includes a device having a first end and a second end. A ratchet link having teeth is carried by the first end. A pawl is pivotally carried by the second end and is adapted to engage one of the teeth. A handle is also pivotally carried by the second end, and a yoke is pivotally carried by the handle. The yoke is adapted to engage a different tooth such that upon pivoting of the handle, the yoke moves the link so that the pawl engages a different tooth.

In accordance with another aspect of the present invention, the clamping apparatus includes a device having a first end and a second end with a ratchet being pivotally mounted relative to the first end on a first axis. A handle is pivotally mounted relative to the second end on a second axis and a pawl is pivotally mounted relative to the second end and is adapted to engage the ratchet. A yoke is pivotally carried by the handle on a third axis and is adapted to engage the ratchet to move the ratchet upon rotation of the handle. The yoke is clamped in place when the third axis is below a line extending between the first axis and the second axis.

A preferred exemplary latching device for a clamp or the like incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

A latching device made in accordance with the present invention is indicated generally by the numeral 10. Latching device 10 is intended for use with a circumferential band clamp, a steel strap, v-band coupler, or the like, which is somewhat schematically and partially shown in FIGS. 3–6, which is indicated generally by the numeral 11, and which will hereinafter be generically referred to as a clamp 11. More particularly, latching device 10 is intended to couple the ends 11A and 11B of a circumferentially split clamp 11. Specifically, latching device 10 not only couples ends 11A and 11B but also serves to tension clamp 11. That is, as the latching device 10 acts to draw ends 11A and 11B closer to each other, as from the FIG. 3 to the FIG. 6 position, the circumference of clamp 11 will decrease to provide a clamping force on whatever is being held by clamp 11.

Figure 1:
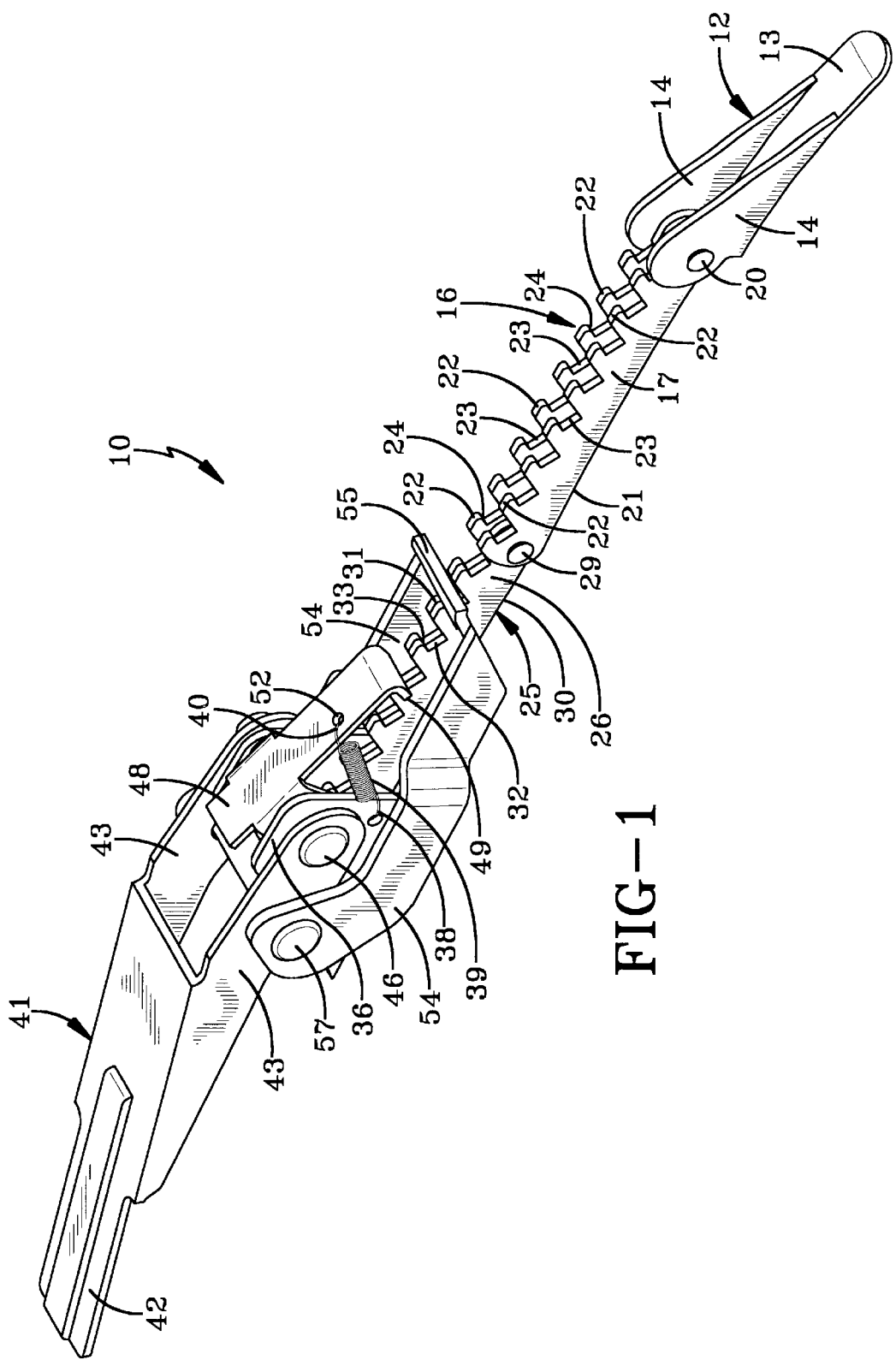
FIG. 1 is a perspective view of a latching device for a clamp or the like made in accordance with the concepts of the present invention.
Figure 2A:
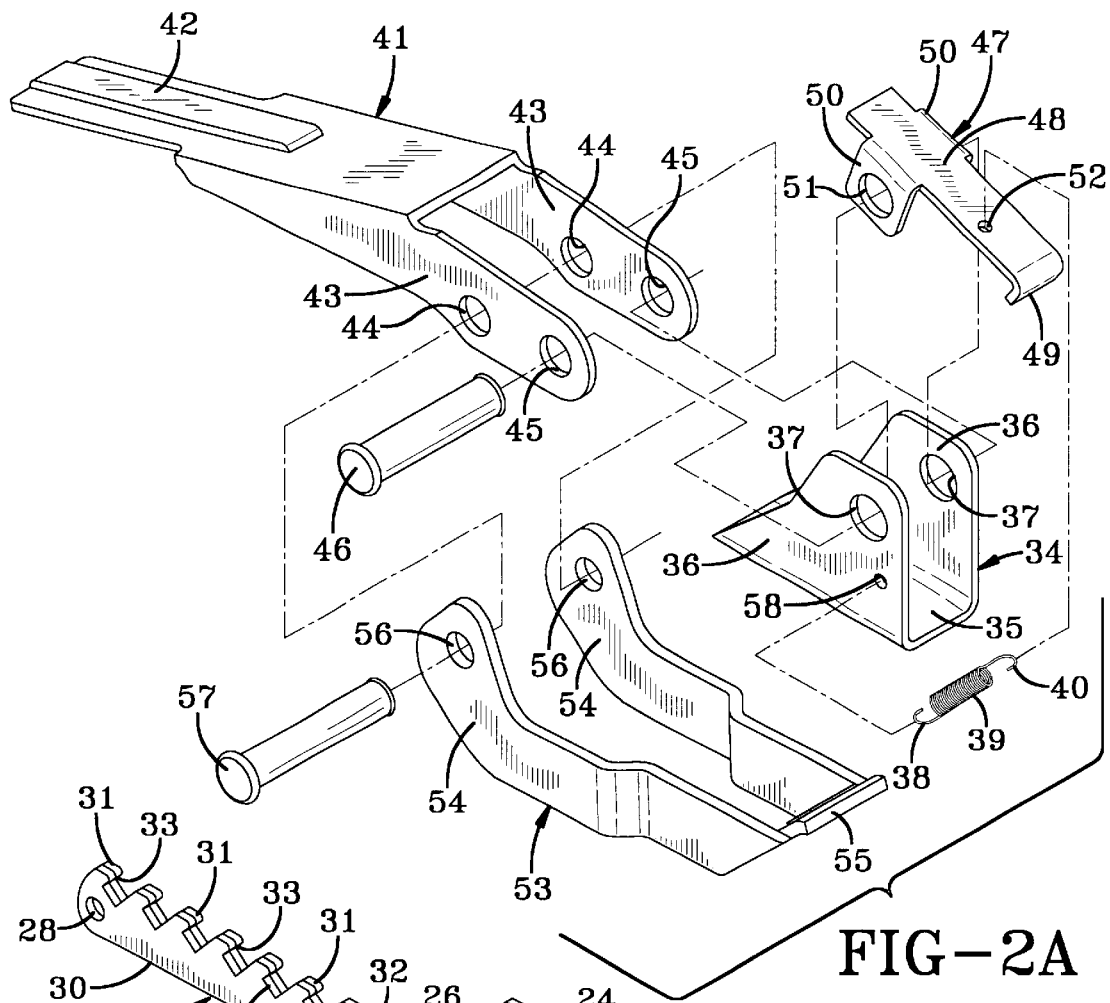
FIG. 2A is an exploded perspective view of one portion of the latching device shown in FIG. 1.
Figure 2B:
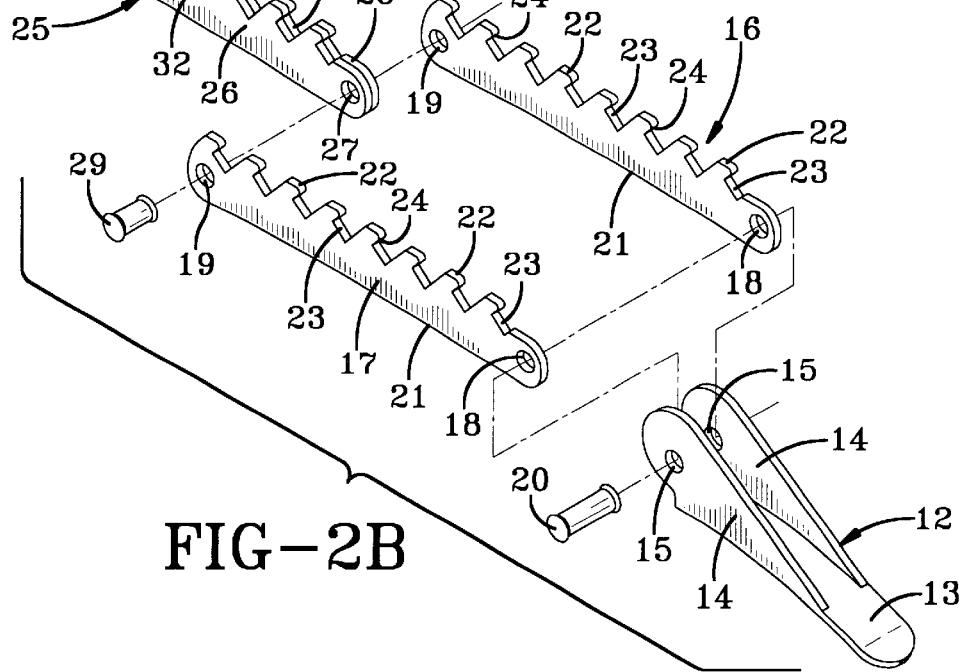
FIG. 2B is an exploded perspective view of the other portion of the latching device shown in FIG. 1.

As best shown in FIG. 2B, one portion of latching device 10 includes a ratchet link support generally indicated by the numeral 12. Ratchet link support 12 includes a base portion 13 which, as shown in FIGS. 3–6, is adapted to be attached to one end, end 11B as shown, of clamp 11. This attachment can be by spot welding, riveting, or the like, and, as shown, base portion 13 is preferably generally arcuate or curved in nature, conveniently forming an arc approximating the arc of the circumference of clamp 11. A pair of opposed and spaced arms 14 extend upwardly from base portion 13 and are provided with aligned apertures 15. A ratchet link, generally indicated by the numeral 16, is preferably formed of two identical link elements 17 which have apertures 18 formed in one end thereof and apertures 19 formed in the other end thereof. Apertures 18 of link elements 17 are aligned with apertures 15 of ratchet link support 12, and ratchet link 16 is pin connected, as by pin 20, to link support 12 so that ratchet link 16 is pivotable relative to support 12. It should be noted that it is preferred that link 16 is made up of two link elements 17 not only to provide a greater surface for engagement by other elements of latching device 10, as will hereinafter be described, but also such will keep the link arms centered during operation, as will hereinafter also be appreciated.

Link elements 17 preferably have a bottom surface 21 which is somewhat arcuate so that it might generally correspond to the circumferential arc of the clamp 11 being tensioned. A plurality of ratchet teeth 22 are formed on the side opposite bottom surface 21 of each link element 17. Ratchet teeth 22 are spaced from each other a predetermined distance established by the length and angle of surfaces 23 between adjacent teeth 22. As will hereinafter become evident, such spacing establishes the increment of movement of latching device 10 as it applies tension to clamp 11. Ratchet teeth 22 are also formed with a surface 24 which is at an angle to vertical, and which, as will hereinafter be discussed, matches the angle of other elements of latching device 10.

Although a single ratchet link 16 of a desired length could provide an adequate total adjustment for latching device 10, if a lengthy adjustment is desired, in order to better accommodate the circumferential arc of a clamp 11, it may be desirable or necessary to provide one or more additional ratchet links. Thus, as shown, a second ratchet link is generally indicated by the numeral 25 which, like link 16, is preferably formed of two identical link elements 26. Link elements 26 are generally identical to link elements 17, and thus, they have apertures 27 formed in one end thereof and apertures 28 formed in the other end thereof. As shown, link elements 26 are placed adjacent to each other and between link elements 17 so that their apertures 27 align with apertures 19 of link elements 17. Ratchet link 16 is thus pivotally connectable to ratchet link 25 by means of a pin 29 received through apertures 19 and 27.

Link elements 26 also preferably have a bottom surface 30 which is somewhat arcuate to, with link elements 17, conform with the circumferential arc of the clamp 11 being tensioned. Ratchet teeth 31, identical to teeth 22, are formed on the side opposite to bottom surface 30 of each link element 26 and are spaced from each other a predetermined distance established by the length and angle of surfaces 32 between adjacent teeth 31. Like teeth 22, ratchet teeth 31 are formed with an angled surface 33 as well. Although two ratchet links 17 and 25 are shown, it should be evident that for certain applications, for example, for very large adjusting ability, even more identical ratchet links could be added to the system with the next ratchet link merely being pivotably attached to link 25, by means of a pin through apertures 28, just like links 25 are attached to link 17. However, if link 25 is the last link, or whatever link is the last link, a rivet or the like (not shown) should be received through apertures 28 to hold elements 26 together.

The remaining elements of latching device 10 are carried by the other end 11A of clamp 11, and are shown in FIG. 2A. These elements include a bracket generally indicated by the numeral 34. Bracket 34 is generally U-shaped having a base portion 35 interconnecting two spaced, upstanding branches 36. As shown in FIGS. 3–6, base portion 35 is adapted to be attached to open end 11A of clamp 11, such as by spot welding, riveting, or the like, and as such, it is preferably generally slightly arcuate in nature to be compatible with the circumferential curvature of clamp 11. Branches 36 are provided with aligned apertures 37, and one branch 36 is provided with an aperture 58 to receive one hook end 38 of a coil spring 39 having an opposed hook end 40.

A handle assembly is generally indicated by the numeral 41 and can include a lever arm 42, which can be of any desired length, at one end, and spaced fork arms 43 at the other end. Fork arms 43 are provided with two pairs of opposed apertures 44 and 45. Bracket 34 is received between arms 43, and its apertures 37 can be aligned with apertures 45 so that a pin 46 may extend therethrough to render handle assembly 41 pivotable with respect to bracket 34 on pin 46.

A locking pawl, generally indicated by the numeral 47, is also carried by pin 46. Pawl 47 includes a generally flat plate 48 having an engaging lip 49 formed at one end thereof. A pair of opposed ears 50 are formed near the other end of plate 48, and each ear is provided with an aperture 51. Ears 50 are received within branches 36 of bracket 34 such that apertures 51 align with apertures 37 of bracket 34 and apertures 45 of arms 43 so that pin 46 may pass therethrough. Locking pawl 47 is thus pivotable about the axis defined by pin 46. Plate 48 also includes an aperture 52 therethrough to receive hook end 40 of spring 39. As a result, pawl 47 is biased by spring 39 in a clockwise direction (as viewed in the drawings) about pin 46.

A quick release yoke is generally indicated by the numeral 53 and includes opposed arms 54 interconnected at one end by an angled lug member 55. The other end of each arm 54 is provided with aligned apertures 56. Fork arms 43 of handle assembly 41 are received between arms 54 such that apertures 56 are aligned with apertures 44 on fork arms 43. A pin 57 is received through apertures 44 and 56 thereby rendering yoke 53 pivotable with respect to handle assembly 41.

Figure 3:
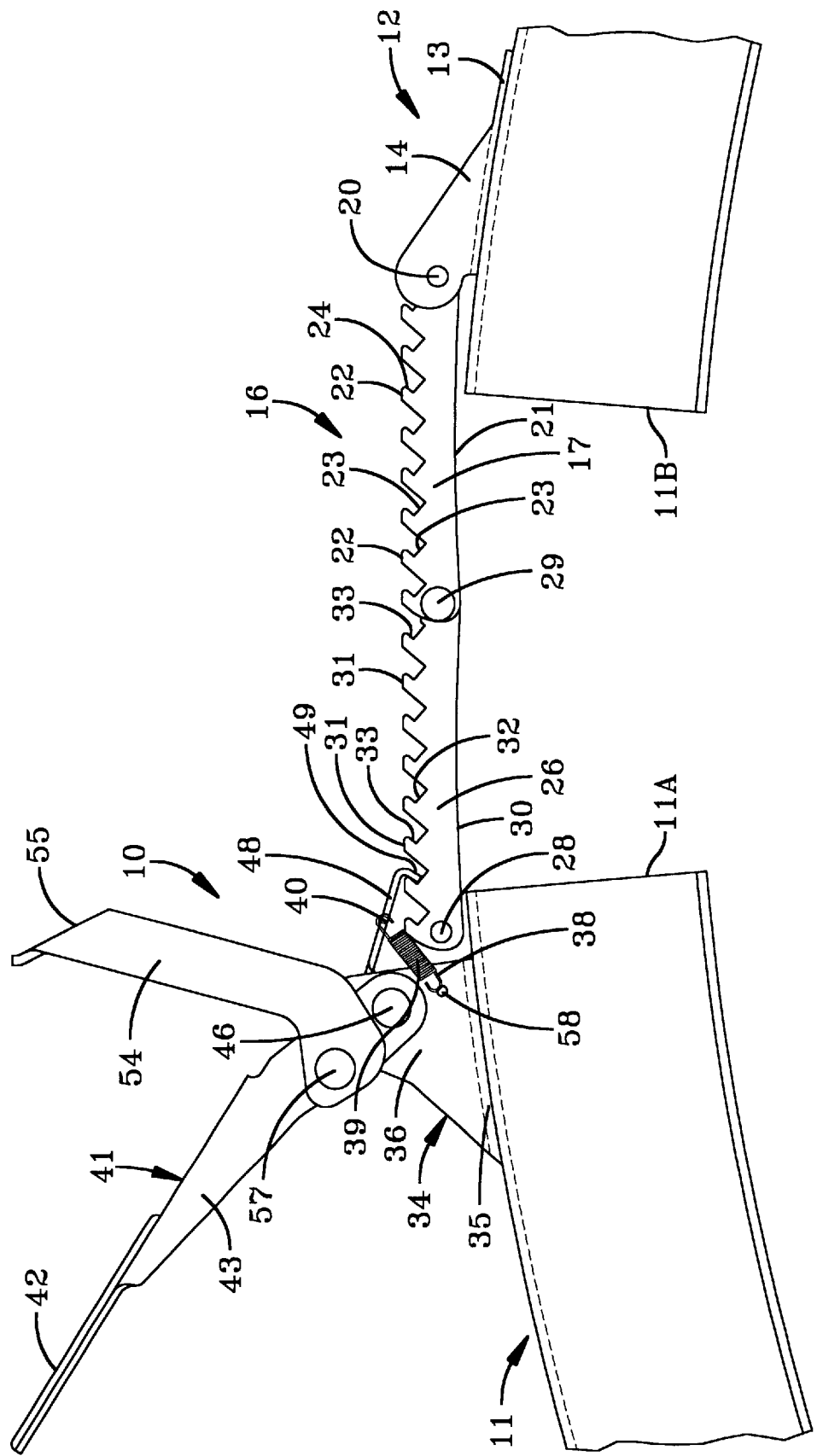
FIG. 3 is a somewhat schematic, fragmentary, side elevational view showing the latching device of FIG. 1 carried by the opposed ends of an open circumferential clamp or the like and being depicted in its initial operating condition.

The operation of latching device 10 to connect the ends 11A and 11B of clamp 11 and to tension clamp 11 around a load or other workpiece is sequentially shown in FIGS. 3–6. As shown in FIG. 3, first, in order to orient or otherwise align the components of latching device 10 carried by clamp end 11B with those carried by clamp end 11A, the end of the last ratchet link, in this instance link 25, is placed adjacent to clamp end 11A and pawl 47 is manually positioned so that its lip 49 is engaging one of the teeth 31. Spring 39 acts to maintain lip 49 in engagement with that tooth.

Figure 4:
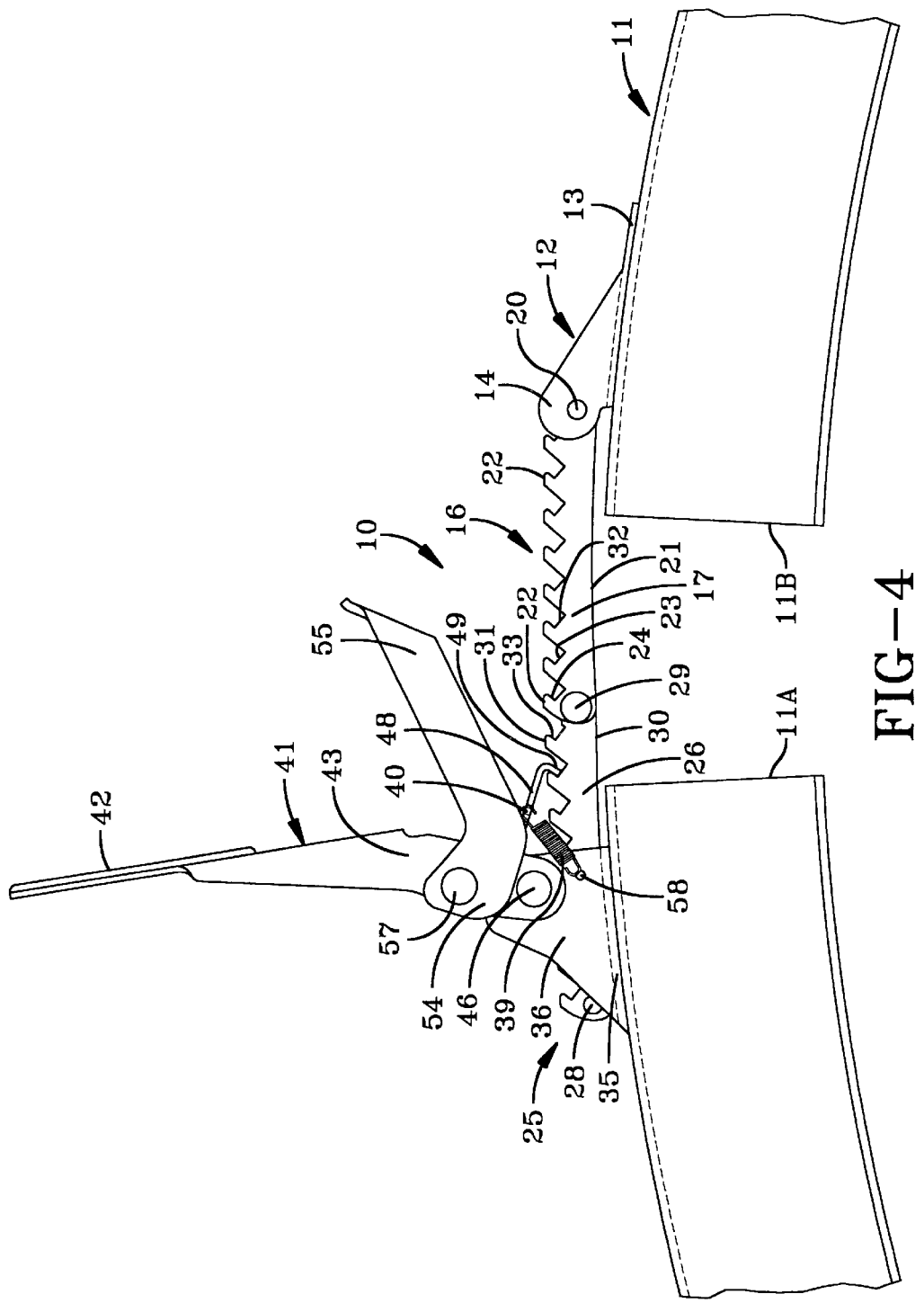
FIG. 4 is a view similar to FIG. 3 and showing the latching device in a condition sequentially following that of FIG. 3 in the operating sequence.

With the components having been so initially aligned, the user can set the initial tension by grasping ends 11A and 11B and manually moving them toward each other to a position shown in FIG. 4. Such movement overcomes the bias of spring 39 and allows the teeth 31 to move under pawl 47. FIG. 4, for example, shows that pawl 47 has been moved a distance of five teeth 31. In this position, clamp 11 is pretensioned, and this tension is maintained by pawl 47.

Figure 5:
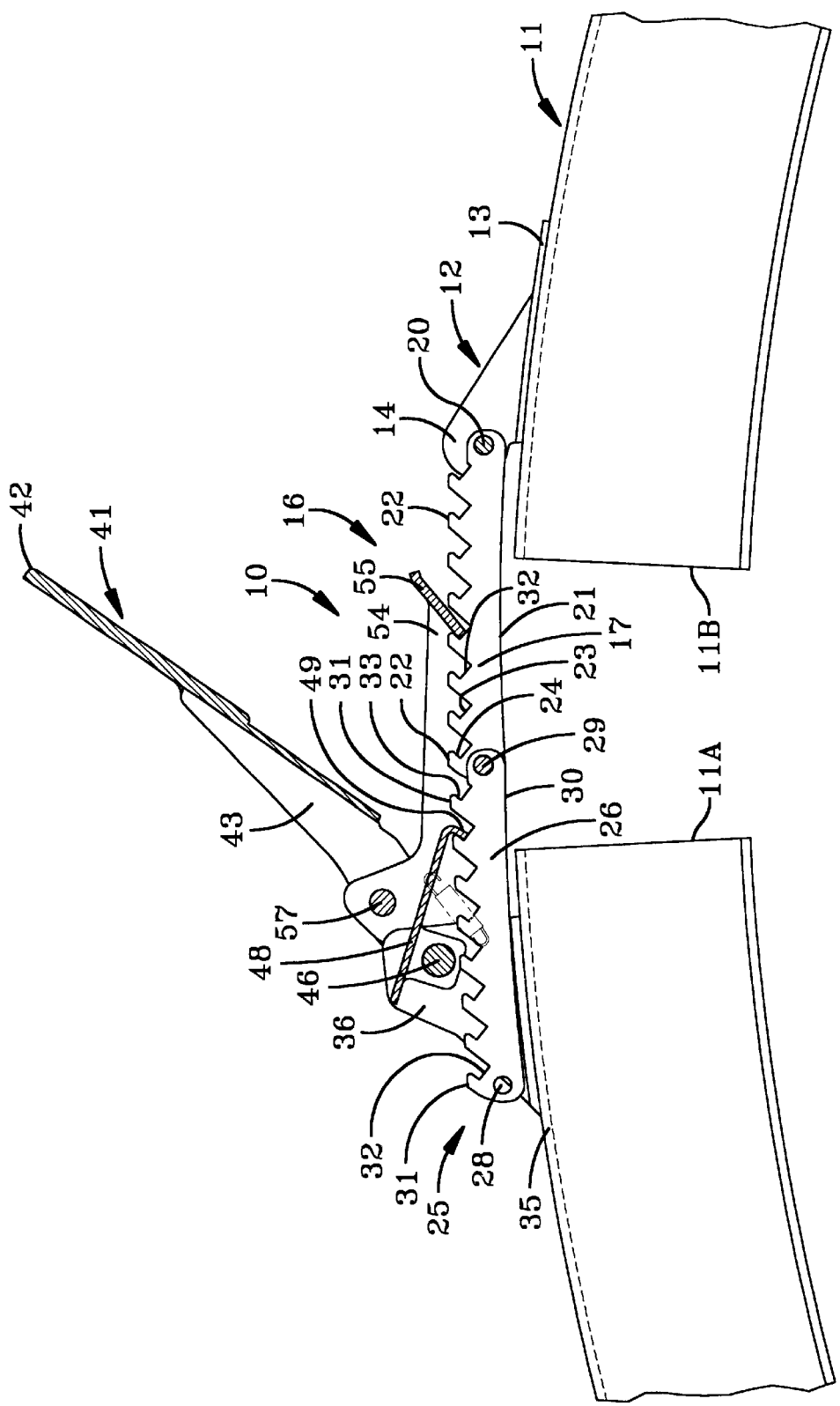
FIG. 5 is a view similar to FIG. 3 and showing the latching device in a condition sequentially following that of FIG. 4 in the operating sequence.

Handle assembly 41 may then be rotated on pin 46 clockwise from the FIG. 3 toward the FIG. 5 position. FIG. 4 shows the condition of the handle assembly 41 when it has been partially rotated. Such rotation allows yoke 53 to pivot on pin 57 and fall into the position shown in FIG. 5 where its lug 55 is engaging one of the teeth, in this instance a tooth 22 of ratchet link 16. It should be noted that the capture angle of yoke 53, as generally defined by the angle of lug 55, preferably matches the angled surfaces 24 or 33 of ratchet teeth 22 and 31, respectively. In addition, the ability of ratchet link 25 to pivot on ratchet link 16, and the ability of ratchet link 16 to pivot on pin 20, assists in maintaining that capture angle the same.

With the components in the FIG. 5 position, the final tensioning of clamp 11, and the ultimate locking thereof, can be accomplished. By virtue of the additional leverage afforded by lever arm 42 of handle assembly 41, clamp 11 may thus be tensioned much greater than the manual tensioning shown in FIGS. 4 and 5. Such can be accomplished on an incremental basis by a small counterclockwise rotation of handle assembly 41 from the FIG. 5 position. By virtue of such rotation, lug 55 pulls on links 16 and 25 and the bias of spring 39 on pawl 47 is overcome so that pawl 47 may be advanced one or more teeth along links 16 or 25 where it will again establish and maintain the tension on clamp 11.

Figure 6:
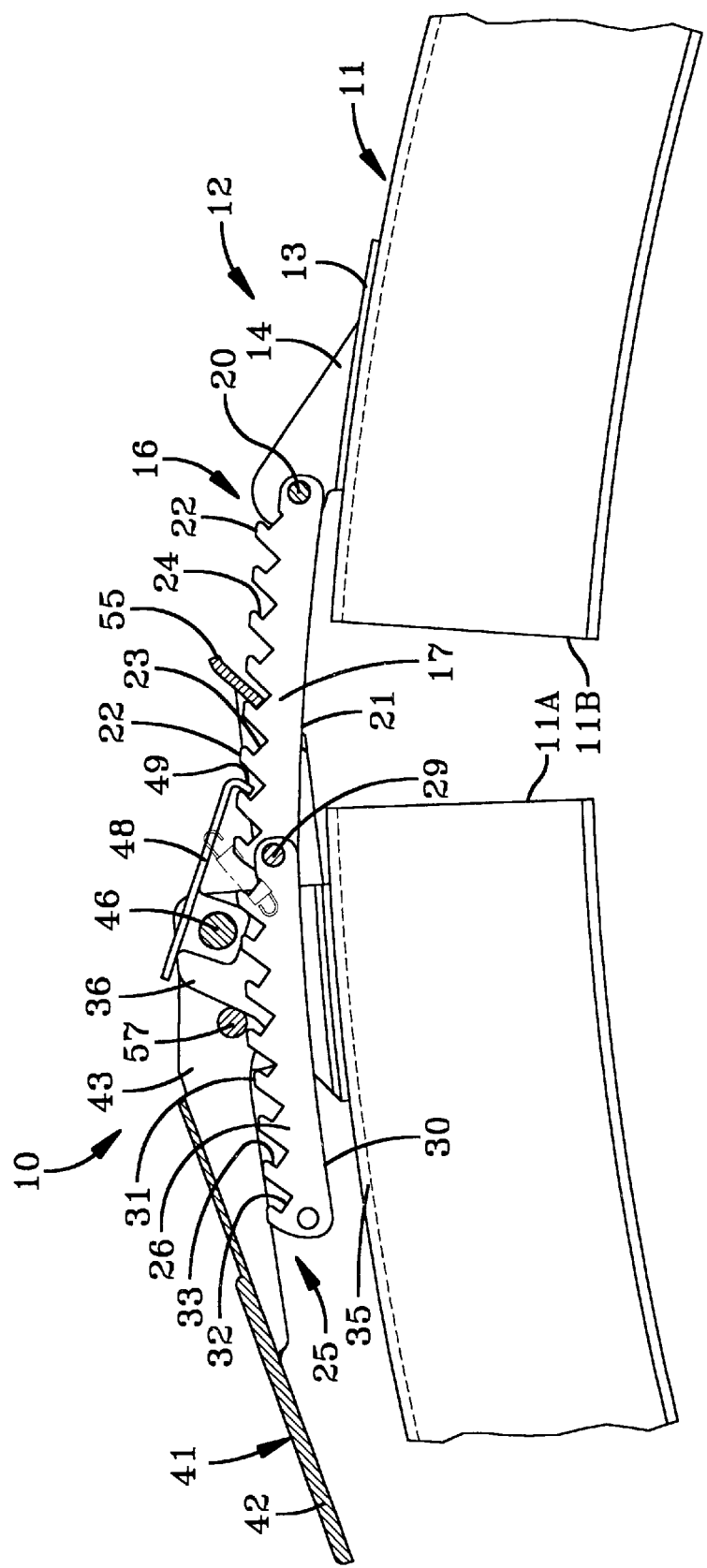
FIG. 6 is a view similar to FIG. 3 and showing the latching device in a condition sequentially following that of FIG. 5 in the operating sequence.

Such "ratcheting" of handle assembly 41 may continue until the operator senses that the maximum possible tension has been placed on clamp 11, that is, until such time that the operator believes that ends 11A and 11B are unable to be drawn any closer to each other. Such a condition is shown in FIG. 6. At this point in time, the operator at least attempts to rotate handle assembly 41 to the fully locked position shown in FIG. 6. However, if too much tension has been placed on clamp ends 11A and 11B, the operator will be physically unable to position handle assembly 51 in the FIG. 6 position and rather, will have to back off pawl 47 at least the distance of one tooth and then try to lock the handle again. Conversely, if the handle assembly 41 is too easily lockable, this may signal to the operator that one further tooth may be engaged.

In either event, when in the FIG. 6 position, handle assembly 41 provides the well known "overcenter" lock for latching device 10. Such is accomplished by virtue of the relationship of the axes of the pivot points of pins 20, 46 and 57, as well as the fact that the pivot point defined by pin 57 rotates on an arc about the pivot point defined by pin 46. Handle assembly 41 is locked or unlocked based on the relationship of the pivot axis defined by pin 57 to a line extending between the pivot axes of pins 20 and 46. If the pivot axis of pin 57 is below that line, handle assembly 41 will remain closed. However, if it is above that line, the handle assembly 41 will snap open.

Based on the foregoing, it should be evident that a latching device made and operated as described herein, can be used to tension and lock a wide variety of clamping devices. As a result, the device accomplishes the objects of the invention and otherwise substantially improves the art.

What is claimed is:

1. A clamping apparatus comprising a device having a first and a second end, a ratchet link carried by said first end, a second ratchet link pivotally connected to said ratchet link, said ratchet link and said second ratchet link having teeth, a pawl carried by said second end and adapted to engage a tooth of said teeth, a handle pivotally carried by said second end, and a yoke pivotally carried by said handle, said yoke being adapted to engage a different tooth of said teeth such that upon pivoting of said handle, said yoke moves said link so that said pawl engages a different tooth of said teeth.

2. The clamping apparatus of claim 1 wherein said second ratchet link includes two ratchet elements positioned adjacent to each other and said first ratchet link includes two ratchet elements positioned on opposed sides of said elements of said second ratchet link.

3. The clamping apparatus of claim 1 wherein said teeth of said ratchet link and said second ratchet link have an angled surface, and said yoke includes a lug member having a correspondingly angled surface.

4. The clamping apparatus of claim 3 wherein the surface of said ratchet link and said second ratchet link opposed to said teeth is generally arcuate.

5. A clamping apparatus comprising a device having a first and a second end, a ratchet link carried by said first end and having teeth, a pawl carried by said second end and adapted to engage a tooth of said teeth, a handle pivotally carried by said second end, a bracket connected to said first end, and a yoke pivotally carried by said handle, said yoke being adapted to engage a different tooth of said teeth such that upon pivoting of said handle, said yoke moves said link so that said pawl engages a different tooth of said teeth, said ratchet link being pivotal about said bracket on a first axis, said handle being pivotal relative to said second end on a second axis, said yoke being pivotal relative to said handle on a third axis, said yoke being clamped to a said tooth when said third axis is below a line extending between said first axis and said second axis.

6. The clamping apparatus of claim 5 wherein said pawl is pivotable on said second axis.

7. The clamping apparatus of claim 5 wherein said third axis pivots about said second axis when said handle is rotated.

8. The clamping apparatus of claim 1 further comprising a bracket attached to said second end, said pawl being pivotally carried by said bracket.

9. The clamping apparatus of claim 8 wherein said pawl is pivotable on a pin carried by said bracket, said handle also being pivotable on said pin.

10. The clamping apparatus of claim 8 further comprising a spring extending between said bracket and said pawl, said spring urging said pawl into engagement with said teeth.

11. A clamping apparatus comprising a device having a first end and a second end, a ratchet pivotally mounted relative to said first end on a first axis, a handle pivotally mounted relative to said second end on a second axis, a pawl pivotally mounted relative to said second end and adapted to engage said ratchet, and a yoke pivotally carried by said handle on a third axis and adapted to engage said ratchet to move said ratchet upon rotation of said handle, said yoke being clamped in place when said third axis is below a line extending between said first axis and said second axis.

12. The clamping apparatus of claim 11 wherein said third axis pivots about said second axis when said handle is rotated.

13. The clamping apparatus of claim 11 wherein said pawl is pivotable on said second axis.

14. The clamping apparatus of claim 13 further comprising a spring biasing said pawl toward said ratchet.

15. The clamping apparatus of claim 11 further comprising a second ratchet pivotally connected to said ratchet.

16. The clamping apparatus of claim 15 said ratchet and said second ratchet each having a generally arcuate surface.

17. The clamping apparatus of claim 11 wherein said ratchet includes spaced teeth adapted to be engaged by said pawl and said yoke.

18. The clamping apparatus of claim 17 wherein said teeth include an angled surface and said yoke includes a lug member having a correspondingly angled surface.

19. Apparatus for latching a first end of a device to a second end of a device to place the device under tension comprising a plurality of ratchet links having spaced teeth, said ratchet links being pivotally connected to each other and being adapted to be carried by the first end, a pawl adapted to be pivotally carried by the second end, a handle adapted to be pivotally carried by the second end, and a yoke pivotally attached to said handle, said pawl being adapted to engage one said tooth and said yoke being adapted to engage another said tooth such that upon rotation of said handle, said yoke moves said link so that said pawl may engage a different said tooth than said one said tooth.

* * * * *